United States Patent
Wada et al.

(10) Patent No.: US 11,508,972 B2
(45) Date of Patent: Nov. 22, 2022

(54) MANUFACTURING METHOD AND MANUFACTURING APPARATUS FOR FUEL CELL MEMBER

(71) Applicant: HONDA MOTOR CO., LTD., Tokyo (JP)

(72) Inventors: Yusuke Wada, Wako (JP); Ryo Takano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/392,548

(22) Filed: Aug. 3, 2021

(65) Prior Publication Data
US 2022/0045339 A1    Feb. 10, 2022

(30) Foreign Application Priority Data

Aug. 6, 2020 (JP) .............................. JP2020-133921

(51) Int. Cl.
*H01M 8/0221*     (2016.01)
*H01M 8/0273*     (2016.01)
*H01M 8/1004*     (2016.01)

(52) U.S. Cl.
CPC ....... *H01M 8/0221* (2013.01); *H01M 8/0273* (2013.01); *H01M 8/1004* (2013.01)

(58) Field of Classification Search
CPC ............ H01M 8/0221; H01M 8/0273; H01M 8/1004; H01M 8/0284; H01M 8/2404; H01M 8/242; H01M 8/0202; H01M 8/2465; H01M 2250/20; Y02E 60/50; Y02P 70/50
See application file for complete search history.

(56) References Cited

U.S. PATENT DOCUMENTS

| | | |
|---|---|---|
| 9,203,103 B2 | 12/2015 | Hayashi et al. |
| 10,014,548 B2 | 7/2018 | Nishiyama et al. |
| 10,297,841 B2 | 5/2019 | Nitta et al. |
| 2021/0242474 A1 | 8/2021 | Ohmori et al. |

FOREIGN PATENT DOCUMENTS

| | | |
|---|---|---|
| CN | 101401246 A | 4/2009 |
| CN | 107719331 A | 2/2018 |
| EP | 3 705 358 A1 | 9/2020 |
| JP | 2000-012067 A | 1/2000 |
| JP | 2014-132548 A | 7/2014 |
| JP | 2014-194876 A | 10/2014 |
| JP | 2015-198068 A | 11/2015 |
| JP | 2016-195106 A | 11/2016 |
| JP | 2021-120927 A | 8/2021 |
| JP | 2021-125329 A | 8/2021 |

OTHER PUBLICATIONS

Office Action including search report dated Aug. 26, 2022 issued over the corresponding Chinese Patent Application No. 202110884829.2 with the English translation of pertinent portion and partial machine translation of search report.

*Primary Examiner* — Helen Oi K Conley
(74) *Attorney, Agent, or Firm* — Carrier Blackman & Associates, P.C.

(57) ABSTRACT

A manufacturing apparatus for a fuel cell member includes a positioning device for positioning a resin frame equipped membrane electrode assembly and a separator member. This positioning device includes a base and positioning pins which are inserted into positioning holes formed in the resin frame equipped membrane electrode assembly and the separator member. Lifting members are provided around the positioning pins. The lifting member is lifted and lowered by a lifting mechanism.

9 Claims, 12 Drawing Sheets

MANUFACTURING METHOD AND MANUFACTURING APPARATUS FOR FUEL CELL MEMBER

CROSS-REFERENCE TO RELATED APPLICATION

This application is based upon and claims the benefit of priority from Japanese Patent Application No. 2020-133921 filed on Aug. 6, 2020, the contents of which are incorporated herein by reference.

BACKGROUND OF THE INVENTION

Field of the Invention

The present invention relates to a manufacturing method and a manufacturing apparatus for a fuel cell member obtained by joining a resin frame equipped membrane electrode assembly and a separator member together.

Description of the Related Art

In the fuel cell stack, a plurality of power generation cells are stacked. The power generation cell includes a resin frame equipped membrane electrode assembly (resin frame equipped MEA) and a pair of separators sandwiching the resin frame equipped MEA. The resin frame equipped MEA includes an electrolyte membrane electrode assembly (MEA) in which an electrolyte membrane is sandwiched between an anode and a cathode, and a frame-shaped resin frame member disposed on an outer peripheral portion of the MEA.

JP 2000-012067 A (see particularly FIGS. 1 and 3) proposes a technique for producing the above-described power generation cell. In this technique, first, a plurality of holding holes are formed in each of the electrolyte membrane and the separator. Next, the MEA and the separator are stacked together such that the holding holes overlap each other. Further, the holding pin is inserted into the holding hole. A retaining ring (snap ring) is fitted to the tip of the holding pin. Thus, the retaining pin is prevented from coming off the retaining hole. That is, the MEA and the separator are connected via the holding pin. As a result, it becomes difficult to separate the MEA and the separator.

When the power generation cells are stacked to obtain the fuel cell stack, the holding pins are connected to each other. Specifically, an engagement hole is formed in a first end portion of the holding pin in the longitudinal direction. Further, an engaging protrusion is provided at a second end portion of the holding pin in the longitudinal direction. In the power generation cells adjacent to each other, the engaging protrusion of the holding pin of one power generation cell is engaged with the engagement hole of the holding pin of the other power generation cell.

SUMMARY OF THE INVENTION

In the fuel cell stack obtained by the above-described manufacturing method, the holding pin remains inside the power generation cell. Therefore, the weight of the fuel cell stack is increased by the weight of the holding pin. In addition, since a holding pin is required for each power generation cell, the number of components increases.

A main object of the present invention is to reduce the weight of a fuel cell stack and to reduce the number of components.

Another object of the present invention is to avoid separation of the resin frame equipped membrane electrode assembly and the separator member joined to each other.

According to an embodiment of the present invention, there is provided a manufacturing method for a fuel cell member, for obtaining a fuel cell member by joining a separator member to a resin frame equipped membrane electrode assembly, the resin frame equipped membrane electrode assembly including a membrane electrode assembly and a frame-shaped resin frame member disposed on an outer peripheral portion of the membrane electrode assembly; the method including:

positioning the resin frame equipped membrane electrode assembly and the separator member by inserting a positioning pin provided in a base of a positioning device into positioning holes formed in the resin frame equipped membrane electrode assembly and the separator member, and stacking the resin frame equipped membrane electrode assembly and the separator member above a lifting member provided in the base, the lifting member being provided around the positioning pin;

welding and joining the resin frame equipped membrane electrode assembly and the separator member to thereby obtain the fuel cell member; and lifting the fuel cell member in a direction away from the positioning pin by lifting the lifting member.

In the stacking, the resin frame equipped membrane electrode assembly or the separator member may be in contact with the lifting member. Conversely, the resin frame equipped membrane electrode assembly or the separator member may be separated from the lifting member. "Stacking above the lifting member" includes both a case of stacking the separator member (or the resin frame equipped membrane electrode assembly) in a state where the resin frame equipped membrane electrode assembly (or the separator member) is in contact with the lifting member and a case of stacking the separator member (or the resin frame equipped membrane electrode assembly) in a state where the resin frame equipped membrane electrode assembly (or the separator member) is separated from the lifting member.

According to another embodiment of the present invention, there is provided a manufacturing apparatus for a fuel cell member, for obtaining a fuel cell member by joining a separator member to a resin frame equipped membrane electrode assembly, the resin frame equipped membrane electrode assembly including a membrane electrode assembly and a frame-shaped resin frame member disposed on an outer peripheral portion of the membrane electrode assembly; the apparatus including:

a positioning device configured to position the resin frame equipped membrane electrode assembly and the separator member, wherein the positioning device includes:

a base;

a positioning pin provided in the base and configured to be inserted into positioning holes formed in the resin frame equipped membrane electrode assembly and the separator member; and a lifting member provided in the base, the lifting member being provided around the positioning pin; and a lifting mechanism configured to lift and lower the lifting member.

According to the present invention, the resin frame equipped membrane electrode assembly and the separator member can be positioned with high accuracy. In this state, when the fuel cell member obtained by joining both members is pressed by the lifting member, the resin frame equipped membrane electrode assembly and the separator member are integrally lifted. Therefore, the resin frame equipped membrane electrode assembly and the separator member can be integrally removed from the positioning device as a fuel cell member without being separated from each other.

Moreover, in this case, a holding pin, a retaining ring, or the like for connecting the power generation cells is unnecessary. Therefore, no retaining pin or retaining ring remains in the fuel cell stack. Therefore, the weight of the fuel cell stack can be reduced.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

First, a fuel cell stack 12 including a member for a fuel cell (which also will be referred to as a fuel cell member) 10 will be described with reference to FIGS. 1 to 4.

Figure 1:
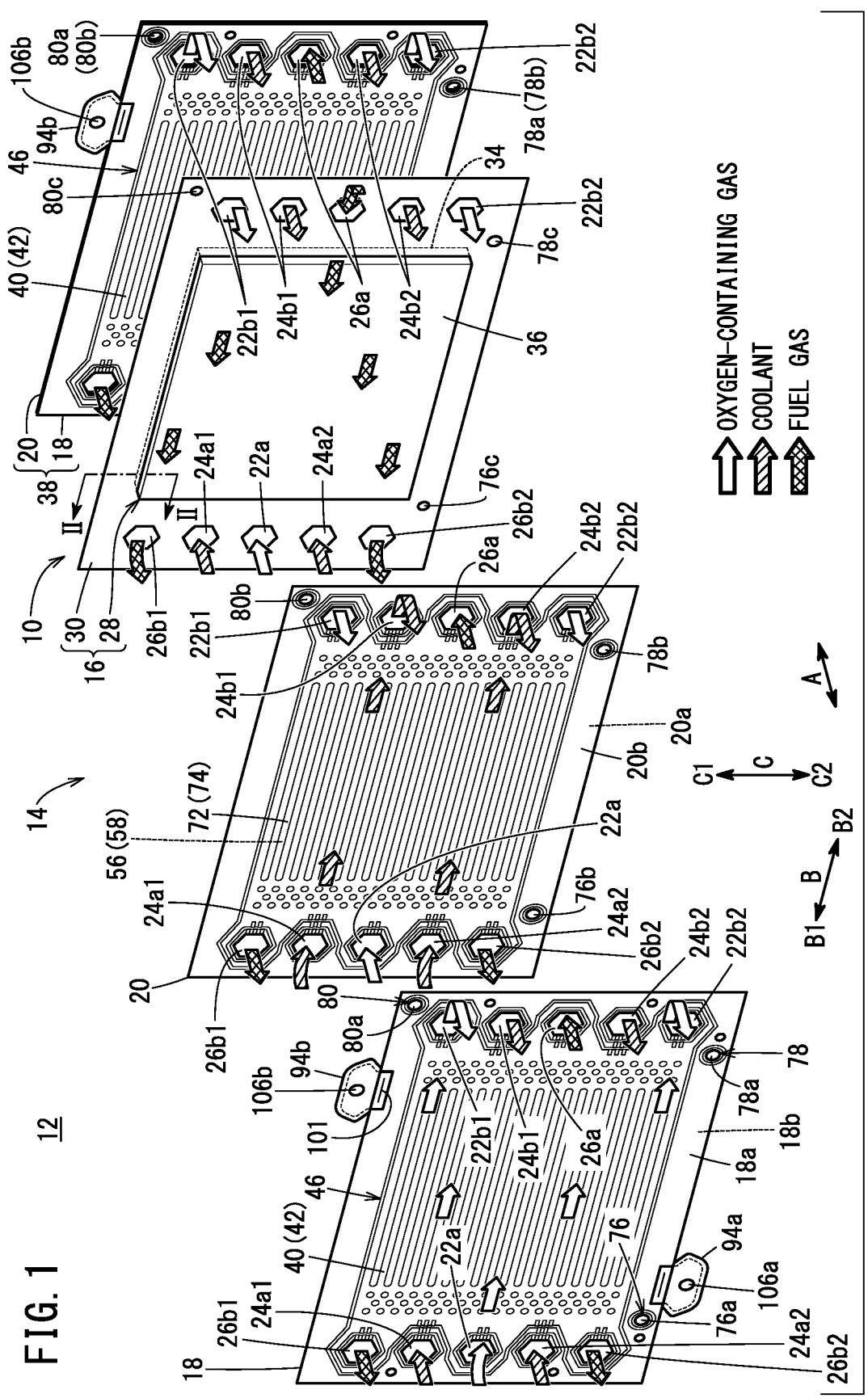
FIG. 1 is a partially exploded perspective view of a fuel cell stack including a fuel cell member.

As shown in FIG. 1, in the fuel cell stack 12, a plurality of power generation cells 14 are stacked along the direction of arrow A. A tightening load (compression load) is applied in the direction of arrow A (stacking direction). The fuel cell stack 12 is mounted on, for example, a fuel cell vehicle. In this case, the stacking direction of the power generation cells 14 is generally the vehicle width direction or the vehicle length direction of the fuel cell vehicle, but the stacking direction may also be the vehicle height direction. The fuel cell stack 12 can also be used as a stationary type.

The power generation cell 14 has a resin frame equipped MEA 16, and a first separator 18 and a second separator 20 that sandwich the resin frame equipped MEA 16 from the directions of arrow A.

In the power generation cell 14, an oxygen-containing gas supply passage 22a, coolant supply passages 24a1 and 24a2, and fuel gas discharge passages 26b1 and 26b2 are provided on the B1 side in the direction indicated by the arrow B. The oxygen-containing gas supply passage 22a of each of the power generation cells 14 extends through the power generation cell along the direction indicated by the arrow A, which is the stacking direction of the power generation cells 14. An oxygen-containing gas is supplied to the oxygen-containing gas supply passage 22a.

The coolant supply passage 24a1 in each power generation cell 14 also extends through the power generation cell along the direction of the arrow A. Similarly, the coolant supply passage 24a2 extends through the power generation cell along the direction of the arrow A. A coolant (for example, pure water, ethylene glycol, oil, or the like) is supplied to the coolant supply passages 24a1 and 24a2.

The fuel gas discharge passage 26b1 of each power generation cell 14 also extends through the power generation cell along the direction of the arrow A. Similarly, the fuel gas discharge passage 26b2 extends through the power generation cell along the direction of the arrow A. A fuel gas (for example, a hydrogen-containing gas) is discharged from the fuel gas discharge passage 26b1, 26b2.

The coolant supply passage 24a1 and the coolant supply passage 24a2 are spaced apart from each other in the direction indicated by the arrow C. The oxygen-containing gas supply passage 22a is located between the coolant supply passage 24a1 and the coolant supply passage 24a2. Further, the fuel gas discharge passages 26b1 and the 26b2 are formed at positions sandwiching the oxygen-containing gas supply passage 22a and the coolant supply passages 24a1 and the 24a2 from the directions indicated by the arrow C.

Note that the fuel gas discharge passage 26b1 is positioned on the C1 direction side relative to the fuel gas discharge passage 26b2 (i.e., the upward in FIG. 1). Similarly, the coolant supply passage 24a1 is positioned on the C1 direction side relative to the coolant supply passage 24a2 (i.e., the upward in FIG. 1).

In the power generation cell 14, a fuel gas supply passage 26a, coolant discharge passages 24b1 and 24b2, and oxygen-containing gas discharge passages 22b1 and 22b2 are provided on the B2 side in the direction indicated by the arrow B. The fuel gas supply passage 26a of each power generation cell 14 extends through the power generation cell along the stacking direction (direction of arrow A) of the power generation cells 14. The fuel gas is supplied to the fuel gas supply passage 26a.

The coolant discharge passage 24b1 in each power generation cell 14 also extends through the cell along the direction of the arrow A. Similarly, the coolant discharge passage 24b2 extends through the cell along the direction of the arrow A. The coolant is discharged from the coolant discharge passages 24b1 and 24b.

The oxygen-containing gas discharge passage 22b1 of each power generation cell 14 also extends in the direction indicated by the arrow A. Similarly, the oxygen-containing gas discharge passage 22b2 extends through the cell along the direction indicated by the arrow A. The oxygen-containing gas is discharged from the oxygen-containing gas discharge passage 22b1 and the oxygen-containing gas discharge passage 22b2.

The coolant discharge passage 24b1 and the coolant discharge passage 24b2 are separated from each other in the arrow C direction. The fuel gas supply passage 26a is disposed between the coolant discharge passage 24b1 and the coolant discharge passage 24b2. The oxygen-containing gas discharge passages 22b1 and the 22b2 sandwich the fuel gas supply passage 26a and the coolant discharge passages 24b1 and the 24b2 in the direction indicated by the arrow C.

The oxygen-containing gas discharge passage 22b1 is located on the C1 side relative to the oxygen-containing gas discharge passage 22b2 (i.e., the upward side in FIG. 1). Similarly, the coolant discharge passage 24b1 is located on the C1 side relative to the coolant discharge passage 24b2 (the upper side in FIG. 1).

In the illustrated example, the oxygen-containing gas supply passage 22a, the oxygen-containing gas discharge passages 22b1, 22b2, the fuel gas supply passage 26a, the fuel gas discharge passages 26b1, 26b2, the coolant supply passages 24a1, 24a2, and the coolant discharge passages 24b1, 24b2 are formed in a hexagonal shape. However, the shape of each communication hole is not particularly limited to a hexagonal shape. For example, each communication hole may have another shape such as a rectangular shape or a triangular shape. The opening area, the position, the shape, and the number of each communication hole are not particularly limited. The opening area, the position, the shape, and the number of each communication hole are appropriately determined according to the specifications of the fuel cell stack 12.

Figure 2:
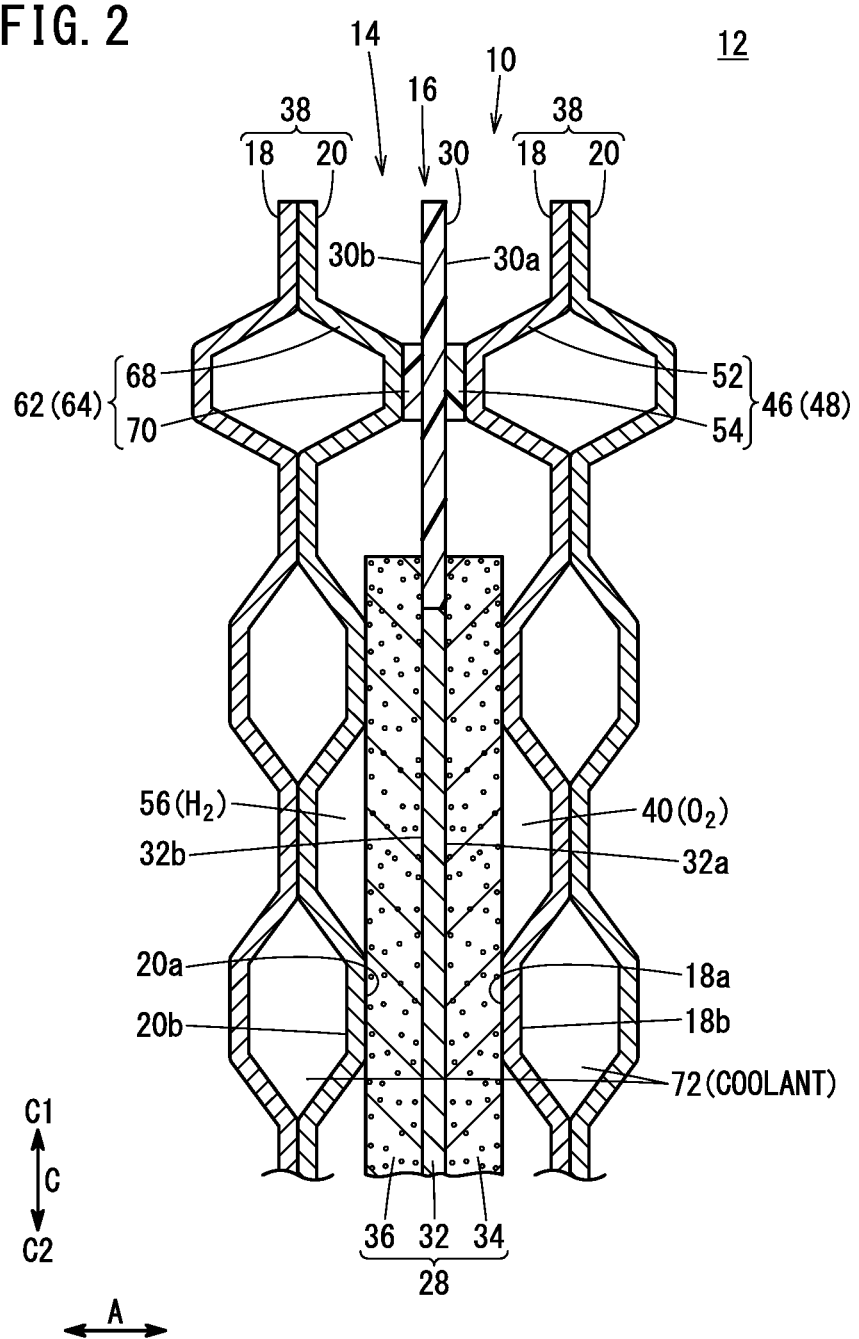
FIG. 2 is a cross-sectional view taken along line II-II in FIG. 1.

As shown in FIGS. 1 and 2, the resin frame equipped MEA 16 includes a membrane electrode assembly (hereinafter also referred to as "MEA") 28 and a resin frame member 30 (resin frame portion, resin film). The resin frame member 30 has an overlapping portion which overlaps with the outer peripheral portion of the MEA 28 and which is joined to the outer peripheral portion. The overlapping portion has a constant thickness and extends around the outer periphery of the MEA 28. In FIG. 2, the MEA 28 includes an electrolyte membrane 32, a cathode 34 provided on a first surface 32a of the electrolyte membrane 32, and an anode 36 provided on a second surface 32b of the electrolyte membrane 32.

The electrolyte membrane 32 is, for example, a solid polymer electrolyte membrane (cation exchange membrane). The solid polymer electrolyte membrane is, for example, a fluorine-based electrolyte such as perfluorosulfonic acid containing water or an HC (hydrocarbon)-based electrolyte. The electrolyte membrane 32 is sandwiched between the cathode 34 and the anode 36.

Although not shown in detail, the cathode 34 includes a first electrode catalyst layer joined to the first surface 32a of the electrolyte membrane 32 and a first gas diffusion layer stacked on the first electrode catalyst layer. The first electrode catalyst layer is formed by uniformly applying an electrode catalyst to the surface of the first gas diffusion layer. The electrode catalyst is, for example, porous carbon particles having a platinum alloy supported on a surface thereof.

The anode 36 includes a second electrode catalyst layer joined to the second surface 32b of the electrolyte membrane 32 and a second gas diffusion layer stacked on the second electrode catalyst layer. The second electrode catalyst layer is formed in the same manner as the first electrode catalyst layer. The first gas diffusion layer and the second gas diffusion layer are made of, for example, carbon paper or carbon cloth.

The surface size of the electrolyte membrane 32 is smaller than the surface size of each of the cathode 34 and the anode 36. The outer peripheral end portion of the cathode 34 and the outer peripheral end portion of the anode 36 sandwich the inner peripheral end portion of the resin frame member 30. The resin frame member 30 is configured so as not to allow permeation of reactant gases (oxygen-containing gas and fuel gas). The resin frame member 30 is provided on the outer peripheral side of the MEA 28.

The resin frame member 30 is made of, for example, various resins such as PPS (polyphenylene sulfide), PPA (polyphthalamide), PEN (polyethylene naphthalate), PES (polyether sulfone), LCP (liquid crystal polymer), PVDF (polyvinylidene fluoride), silicone, fluorine compound, m-PPE (modified polyphenylene ether), PET (polyethylene terephthalate), PBT (polybutylene terephthalate), or modified polyolefin.

The resin frame equipped MEA 16 may be formed of a frame-shaped film. In this case, a portion of the electrolyte membrane 32 that protrudes outward from the cathode 34 and the anode 36 is sandwiched between two films from both sides.

Each of the first separator 18 and the second separator 20 is made of, for example, a steel plate, a stainless steel plate, an aluminum plate, a plated steel plate, a metal plate whose surface is subjected to anticorrosion treatment, or the like, and is formed in a rectangular shape (quadrangular shape). The first separator 18 and the second separator 20 are obtained by press-forming the above-described metal thin plate so as to have a corrugated shape in cross section and a wavy shape on the surface. In the state where the first separator 18 and the second separator 20 are stacked together, the outer peripheral portions of the first separator 18 and the second separator 20 are joined together by welding, brazing, crimping, etc. As a result, the joint separator 38 is obtained as a separator member. As will be described later, the fuel cell member 10 includes a joint separator 38 and a resin frame equipped MEA 16.

Figure 3:
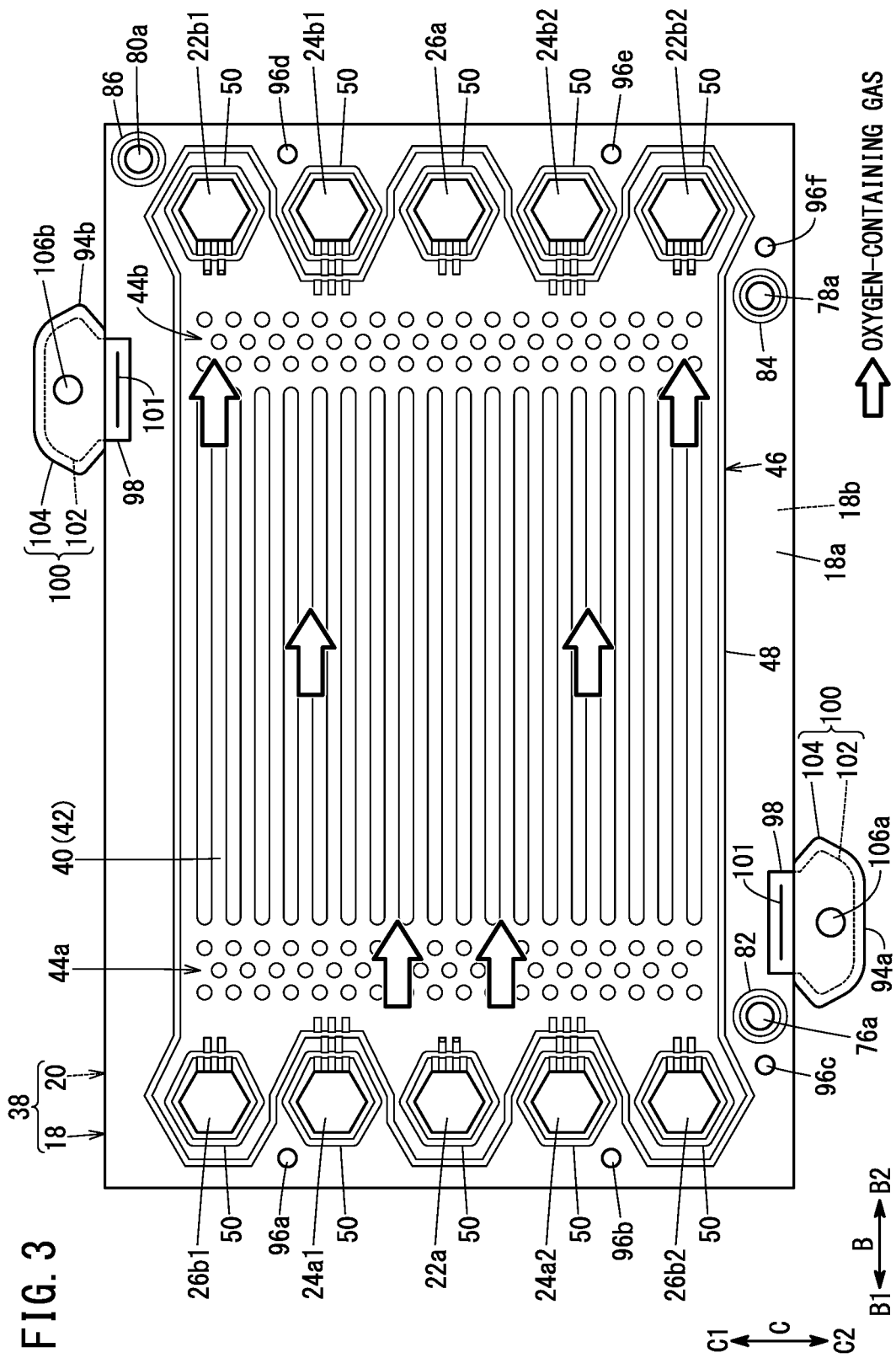
FIG. 3 is a schematic overall plan view of a first separator.

As shown in FIG. 3, an oxygen-containing gas flow field 40 is provided on a first surface 18a of the first separator 18 that faces the MEA 28. The oxygen-containing gas flow field 40 communicates with the oxygen-containing gas supply passage 22a and the oxygen-containing gas discharge passages 22b1 and 22b2. The oxygen-containing gas flow field 40 has a plurality of oxygen-containing gas flow grooves 42. Each of the oxygen-containing gas flow grooves 42 extends along the direction indicated by the arrow B, for example, in a linear or wavy shape.

The first separator 18 is provided with a first inlet buffer portion 44a and a first outlet buffer portion 44b. The first inlet buffer portion 44a and the first outlet buffer portion 44b are obtained by press-forming the first separator 18. The first inlet buffer portion 44a is located between the oxygen-containing gas supply passage 22a and the oxygen-containing gas flow field 40. The first outlet buffer portion 44b is located between the oxygen-containing gas discharge passages 22b1, 22b2 and the oxygen-containing gas flow field 40. Each of the first inlet buffer portion 44a and the first outlet buffer portion 44b includes a plurality of bosses.

The first separator 18 is provided with a first seal portion 46. The first seal portion 46 prevents leakage of fluid (the oxygen-containing gas, the fuel gas, and the coolant) from between the resin frame equipped MEA 16 and the first separator 18. The first seal portion 46 includes a first outer peripheral seal portion 48 formed on the outer peripheral portion of the first separator 18, and a passage seal portion 50 surrounding each passage (e.g., oxygen-containing gas supply passage 22a or the like). The first seal portion 46 may further include a seal portion surrounding the outside of the first outer peripheral seal portion 48 of the first separator 18. The first seal portion 46 extends linearly when viewed from the separator thickness direction (the direction of arrow A). However, the first seal portion 46 may extend in a wavy shape when viewed in the separator thickness direction.

In FIG. 2, the first seal portion 46 includes a first metal bead portion 52 and a first resin member 54. The first metal bead portion 52 is integrally formed with the first separator 18. The first resin member 54 is provided on the first metal bead portion 52. The first metal bead portion 52 protrudes from the first separator 18 toward the resin frame member 30. The cross-sectional shape of the first metal bead portion 52 is a trapezoidal shape that tapers toward the protruding direction of the first metal bead portion 52. The first resin member 54 is an elastic member fixed to the protruding end surface of the first metal bead portion 52 by printing, coating, or the like. The first resin member 54 is made of, for example, polyester fiber.

Figure 4:
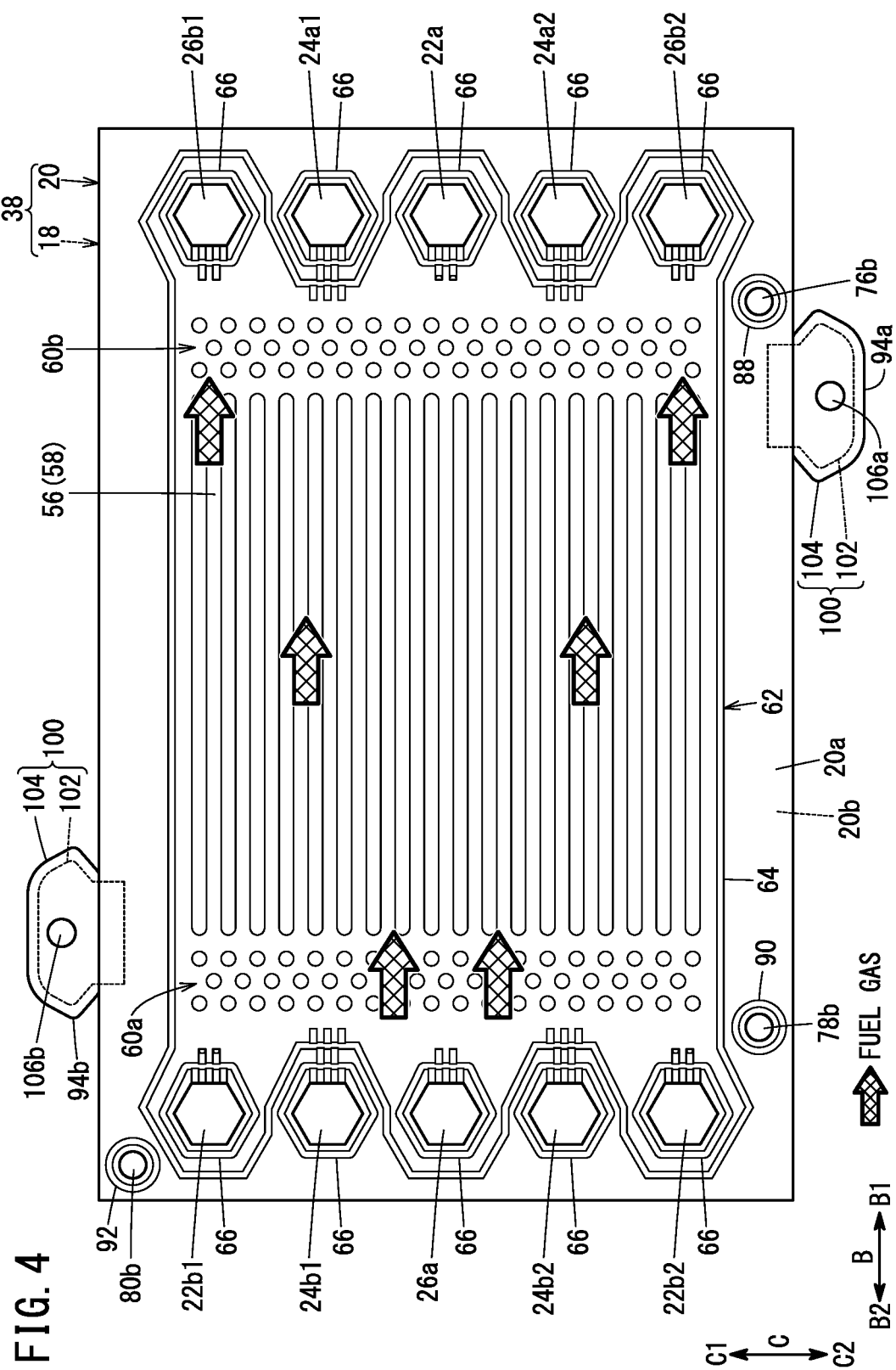
FIG. 4 is a schematic overall plan view of a second separator.

As shown in FIG. 4, a fuel gas flow field 56 is provided on a first surface 20a of the second separator 20 that faces the MEA 28. The fuel gas flow field 56 communicates with the fuel gas supply passage 26a and the fuel gas discharge passages 26b1 and 26b2. The fuel gas flow field 56 has a plurality of fuel gas flow grooves 58 extending in the direction of arrow B. Each of the fuel gas flow grooves 58 may extend in a wave shape in the direction of the arrow B.

The second separator 20 is provided with a second inlet buffer portion 60a and a second outlet buffer portion 60b. The second inlet buffer portion 60a and the second outlet buffer portion 60b are obtained by press forming the second separator 20. The second inlet buffer portion 60a is located between the fuel gas supply passage 26a and the fuel gas flow field 56. The second outlet buffer portion 60b is located between the fuel gas discharge passages 26b1, 26b2 and the fuel gas flow field 56. Each of the second inlet buffer portion 60a and the second outlet buffer portion 60b includes a plurality of bosses.

The second separator 20 is provided with a second seal portion 62. The second seal portion 62 prevents fluid (the oxygen-containing gas, the fuel gas, and the coolant) from leaking to the outside from between the resin frame equipped MEA 16 and the second separator 20. The second seal portion 62 includes a second outer peripheral seal portion 64 and a plurality of second passage seal portions 66. The second seal portion 62 is formed on the outer peripheral portion of the second separator 20. The second passage seal portion 66 surrounds each passage (the oxygen-containing gas supply passage 22a and the like). The second seal portion 62 may further include a seal portion surrounding the outside of the second outer peripheral seal portion 64 of the second separator 20. The second seal portion 62 extends linearly when viewed from the separator thickness direction (the arrow A direction). However, the second seal portion 62 may extend in a wavy shape when viewed in the separator thickness direction.

In FIG. 2, the second seal portion 62 includes a second metal bead portion 68 integrally formed with the second separator 20, and a second resin member 70 provided on the second metal bead portion 68. The second metal bead portion 68 protrudes from the second separator 20 toward the resin frame member 30. The cross-sectional shape of the second metal bead portion 68 is a trapezoidal shape that tapers toward the protruding direction of the second metal bead portion 68. The second resin member 70 is an elastic member fixed to the protruding end surface of the second metal bead portion 68 by printing, coating, or the like. The second resin member 70 is made of, for example, polyester fiber.

The first seal portion 46 and the second seal portion 62 overlap each other when viewed in the separator thickness direction. Therefore, when a tightening load (compressive load) is applied to the fuel cell stack 12, each of the first metal bead portion 52 and the second metal bead portion 68 undergoes elastic deformation (compressive deformation). In this state, the protruding end surface (first resin member 54) of the first seal portion 46 is in airtight- and liquid-tight contact with the first surface 30a of the resin frame member 30. At the same time, the protruding end surface (second resin member 70) of the second seal portion 62 comes into airtight- and liquid-tight contact with a second surface 30b of the resin frame member 30.

The first resin member 54 may be provided on the first surface 30a of the resin frame member 30, not on the first metal bead portion 52. The second resin member 70 may be provided on the second surface 30b of the resin frame member 30, not on the second metal bead portion 68. At least one of the first resin member 54 and the second resin member 70 may be omitted. The first seal portion 46 and the second seal portion 62 may be formed of an elastic rubber seal member having elasticity, instead of the metal bead seal.

In FIGS. 1 and 2, a coolant flow field 72 is provided between the second surface 18b of the first separator 18 and the second surface 20b of the second separator 20. The coolant flow field 72 communicates with the coolant supply passages 24a1 and 24a2 and the coolant discharge passages 24b1 and 24b2. The coolant flow field 72 has a plurality of coolant flow grooves 74 extending linearly in the direction of arrow B. The coolant flow field 72 is formed by putting together the back surface of the oxygen-containing gas flow field 40 and the back surface of the fuel gas flow field 56.

In FIGS. 1, 3, and 4, the power generation cell 14 is further provided with a first drain communication hole 76, a second drain communication hole 78, and an air vent communication hole 80. The first drain communication holes 76 of the power generation cells 14 communicate with each other in the direction of arrow A, which is the stacking direction of the power generation cells 14. The first drain communication hole 76 is located at an end portion of the power generation cell 14 in the C2 direction, and is closer to the B1 direction side than the center of the power generation cell 14 in the longitudinal direction (the arrow B direction). In other words, the first drain communication hole 76 is closer to the C2 direction side (lower side) than the lower end of the fuel gas discharge passage 26b2.

The first drain communication hole 76 communicates with the fuel gas discharge passages 26b1 and 26b2 via a communication passage (not shown). During operation of the power generation cell 14 (during power generation), water is generated. The first drain communication hole 76 discharges water, of the generated water, that has been guided to the fuel gas discharge passages 26b1 and 26b2 to the outside.

The first drain communication hole 76 includes first drain holes 76a to 76c. The first drain hole 76a is formed in the outer peripheral portion of the first separator 18. The first drain hole 76b is formed in the outer peripheral portion of the second separator 20. Further, the first drain hole 76c is formed in the resin frame member 30. Each of the first drain holes 76a to 76c is formed in a circular shape. The diameters of the first drain holes 76a and 76b formed in the joint separator 38 are larger than the first diameter D1 of the first drain hole 76c formed in the resin frame member 30.

The second drain communication holes 78 of the respective power generation cells 14 communicate with each other in the arrow A direction. The second drain communication hole 78 is positioned at an end portion on the C2 side of the power generation cell 14, and is closer to the B2 side than the center in the longitudinal direction (the arrow B direction) of the power generation cell 14. In other words, the second drain communication hole 78 is located closer to the C2 side (lower side) than the lower end of the oxygen-containing gas discharge passage 22b2.

The second drain communication hole 78 communicates with the oxygen-containing gas discharge passages 22b1 and 22b2 via a communication passage (not shown). That is, the second drain communication hole 78 discharges water, of the generated water, that has been guided to the oxygen-containing gas discharge passages 22b1 and 22b2 to the outside.

The second drain communication hole 78 includes second drain holes 78a to 78c. The second drain hole 78a is formed in the outer peripheral portion of the first separator 18. The second drain hole 78b is formed in the outer peripheral portion of the second separator 20. Further, the second drain hole 78c is formed in the resin frame member 30. Each of the second drain holes 78a to 78c is formed in a circular shape. The diameters of the second drain holes 78a and 78b formed in the joint separator 38 are the same as the diameter of the second drain hole 78c formed in the resin frame member 30. However, the size, the shape, the number, and the position of the second drain holes 78a to 78c can be appropriately changed.

The air vent communication holes 80 of each power generation cell 14 communicate with each other in the direction of the arrow A. The air vent communication hole 80 is positioned at an end portion on the C1 side of the power generation cell 14, and is closer to the B2 side than the center of the power generation cell 14 in the longitudinal direction (the arrow B direction). To be specific, the air vent communication hole 80 is located in a rectangular columnar portion of the power generation cell 14 on the C1 side and the B2 side, and is located closer to the C1 side (upper side) than the upper end of the coolant discharge passage 24b1.

The air vent communication hole 80 communicates with the coolant discharge passages 24b1 and 24b2 via a communication hole (not shown). The air vent communication hole 80 discharges air in the coolant to the outside. The air vent communication hole 80 and the first drain communication hole 76 have a substantially diagonal positional relationship.

The air vent communication hole 80 includes air vent holes 80a to 80c. The air vent hole 80a is formed in the outer peripheral portion of the first separator 18. The air vent hole 80b is formed in the outer peripheral portion of the second separator 20. Further, the air vent hole 80c is formed in the resin frame member 30. Each of the air vent holes 80a to 80c is formed in a circular shape. The diameters of the air vent holes 80a and 80b formed in the joint separator 38 are larger than the second diameter D2 of the air vent hole 80c formed in the resin frame member 30. The first diameter D1 and the second diameter D2 are typically the same. However, the first diameter D1 and the second diameter D2 may be different.

In FIG. 3, the first separator 18 is provided with drain seal portions 82 and 84 and an air seal portion 86. The drain seal portion 82 surrounds the first drain hole 76a. The drain seal portion 84 surrounds the second drain hole 78a. Further, the air seal portion 86 surrounds the air vent hole 80a. The drain seal portions 82 and 84 and the air seal portion 86 are formed in the same manner as the first seal portion 46 described above. However, the drain seal portions 82 and 84 and the air seal portion 86 may be formed of an elastic rubber seal member instead of the metal bead seal.

As shown in FIG. 4, the second separator 20 is provided with drain seal portions 88 and 90 and an air seal portion 92. The drain seal portion 88 surrounds the first drain hole 76b. Further, the drain seal portion 90 surrounds the second drain hole 78b. Further, the air seal portion 92 surrounds the air vent hole 80b. The drain seal portions 88 and 90 and the air seal portion 92 are formed in the same manner as the second seal portion 62 described above. However, the drain seal portions 88 and 90 and the air seal portion 92 may be formed of an elastic rubber seal member instead of the metal bead seal.

In FIG. 3, a first tab 94a and a second tab 94b protrude from the outer peripheral portion of the first separator 18. Six openings 96a to 96f for welding are formed in the outer peripheral portion of the first separator 18. The number of the openings 96a to 96f is not limited to six.

The first tab 94a and the second tab 94b engage with a support member (not shown) of the fuel cell stack 12 when an external load in the direction of arrow B acts on the fuel cell stack 12. Thus, the first tab 94a and the second tab 94b function as load receiving portions that receive an external load. As a result, when an external load in the direction of the arrow B acts on the fuel cell stack 12, the joint separator 38 is prevented from being displaced in the direction of the arrow B.

The first tab 94a is located at an outer edge portion of the first separator 18 that is located on the C2 side, and is closer to the B1 side than the center of the first separator 18 in the longitudinal direction (the arrow B direction). However, the first tab 94a may be positioned substantially at the center in the longitudinal direction of the first separator 18. The first tab 94a includes an attachment portion 98 and a tab body 100. The attachment portion 98 is fixed to the outer peripheral portion of the first separator 18. The tab body 100 protrudes from the attachment portion 98 in the C2 direction. The attachment portion 98 is joined to the outer peripheral portion of the first separator 18 by a joining portion 101. The joining portion 101 is formed by spot welding, laser welding, MIG welding, TIG welding, brazing, or the like.

The tab body 100 includes a core metal 102 connected to the attachment portion 98 and a resin member 104 covering the core metal 102. The core metal 102 and the attachment portion 98 are integrally formed by punching a metal plate. The resin member 104 has electrical insulation properties. Examples of the material of the resin member 104 include a thermoplastic resin, a thermosetting resin, and a thermoplastic elastomer.

In the central portion of the tab body 100 of the first tab 94a, a circular first through hole 106a is formed in the resin member 104. The first through hole 106a is located outward of the outer shape of the resin frame member 30. That is, the first through hole 106a does not overlap the resin frame member 30 when viewed in the separator thickness-wise direction. The first through hole 106a is close to the first drain communication hole 76. The diameter of the first through hole 106a is larger than the diameter of any of the first drain communication holes 76 (first drain holes 76a, 76b, and 76c) formed in the first separator 18, the second separator 20, and the resin frame member 30.

The second tab 94b is positioned at the outer edge portion of the first separator 18 on the C1 side, and is closer to the B2 side than the center of the first separator 18 in the longitudinal direction (the arrow B direction). The second tab 94b may be positioned substantially at the center in the longitudinal direction of the first separator 18. The second tab 94b is configured in the same manner as the first tab 94a described above. Therefore, a detailed description of the configuration of the second tab 94b will be omitted.

In the central portion of the tab body 100 of the second tab 94b, a circular second through hole 106b is formed in the resin member 104. The second through hole 106b is located outward of the outer shape of the resin frame member 30. That is, the second through hole 106b does not overlap the resin frame member 30 when viewed in the separator thickness-wise direction. The second through hole 106b is close to the air vent communication hole 80. The diameter of the second through hole 106b is larger than the diameter of all the air vent communication holes 80 (air vent holes 80a, 80b, and 80c) formed in the first separator 18, the second separator 20, and the resin frame member 30.

Figure 8:
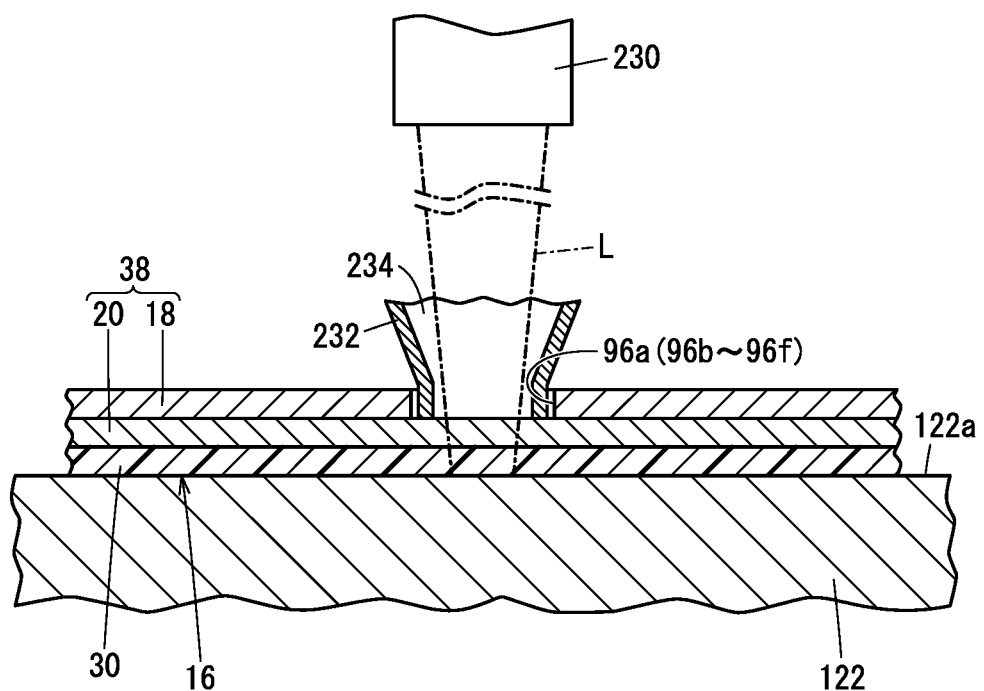
FIG. 8 is a schematic cross-sectional view of main part showing an irradiation device constituting the manufacturing apparatus, a pressing and holding member, and a fuel cell member together.

The openings 96a to 96f shown in FIG. 3 are holes through which laser light L, which is a heat source for welding the second separator 20 in the joint separator 38 and the resin frame member 30, passes when the fuel cell member 10 is manufactured (see FIG. 8). That is, the joint separator 38 (second separator 20) is welded to the resin frame member 30 at the positions of the openings 96a to 96f. It is sufficient that the openings 96a to 96f are provided in one of the first separator 18 and the second separator 20. However, the openings may be provided in both of the first separator 18 and the second separator 20.

The three openings 96a to 96c are located at the end portion of the first separator 18 on the B1 side. To be specific, the opening 96a is close to the fuel gas discharge passage 26b1 and the coolant supply passage 24a1. On the other hand, the opening 96b is close to the coolant supply passage 24a2 and the fuel gas discharge passage 26b2. The opening 96c is close to the B1 side of the first drain hole 76a.

The three openings 96d to 96f are located at the end of the first separator 18 on the B2 side. To be specific, the opening 96d is close to the oxygen-containing gas discharge passage 22b1 and the coolant discharge passage 24b1. On the other hand, the opening 96e is close to the coolant discharge passage 24b2 and the oxygen-containing gas discharge passage 22b2. The opening 96f is closer to the B2-direction side than the second drain hole 78a.

Next, the operation of the fuel cell stack 12 configured as described above will be described.

First, as shown in FIG. 1, the oxygen-containing gas is introduced from the oxygen-containing gas supply passage 22a into the oxygen-containing gas flow field 40 of the first separator 18. The oxygen-containing gas flows along the oxygen-containing gas flow field 40 in the direction indicated by the arrow B, and is supplied to the cathode 34 on the MEA 28.

On the other hand, the fuel gas is introduced into the fuel gas flow field 56 of the second separator 20 from the fuel gas supply passage 26a. The fuel gas moves in the direction of arrow B along the fuel gas flow field 56, and is supplied to the anode 36 on the MEA 28.

Therefore, in each MEA 28, the oxygen-containing gas supplied to the cathode 34 and the fuel gas supplied to the anode 36 are individually consumed by electrochemical reactions in the first electrode catalyst layer and the second electrode catalyst layer. Thus, electric power is generated.

The oxygen-containing gas supplied to the cathode 34 is distributed to the oxygen-containing gas discharge passage 22b1 and the oxygen-containing gas discharge passage 22b2. The oxygen-containing gas flowing into the oxygen-containing gas discharge passages 22b1 and 22b2 flows in the direction indicated by the arrow A and is discharged. The fuel gas supplied to the anode 36 is then distributed to the fuel gas discharge passages 26b1 and 26b2. The fuel gas flowing into the fuel gas discharge passages 26b1, 26b2 flows in the direction of arrow A and is discharged.

The coolant is supplied to the coolant supply passages 24a1 and 24a2. Thereafter, as shown in FIG. 1, the coolant is introduced into the coolant flow field 72 formed between the first separator 18 and the second separator 20. The coolant flows through the coolant flow field 72 along the direction of the arrow B. After cooling the MEA 28, the coolant is discharged from the coolant discharge passages 24b1 and 24b2.

Next, a manufacturing method and a manufacturing apparatus for the fuel cell member 10 according to the present embodiment will be described. Here, the fuel cell member 10 is obtained by stacking the resin frame equipped MEA 16 and the joint separator 38 on each other and then welding them to each other. The fuel cell stack 12 is obtained by stacking a predetermined number of the fuel cell members 10.

Figure 5:
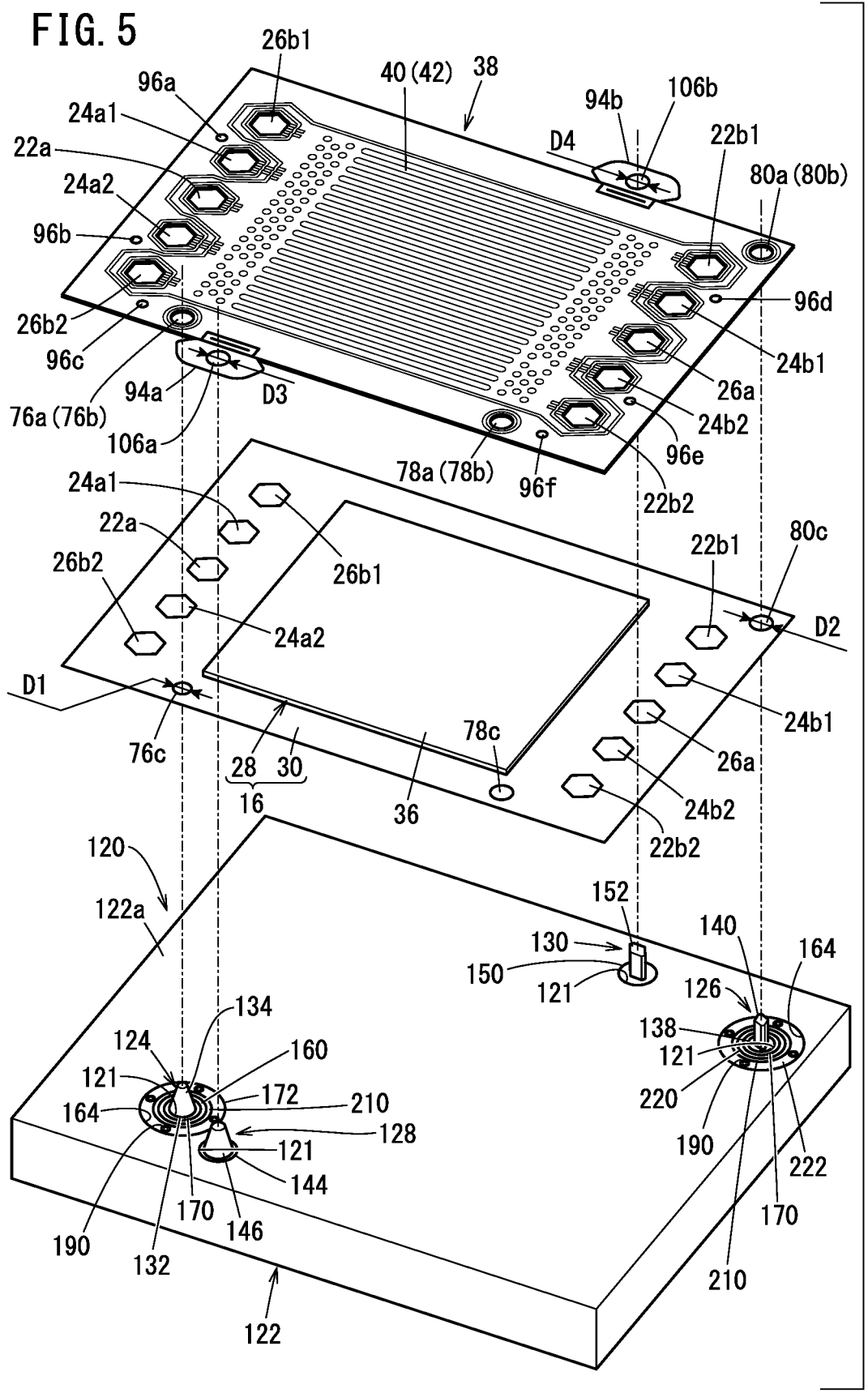
FIG. 5 is a schematic perspective view of main part showing a positioning device constituting a manufacturing apparatus according to the embodiment of the present invention together with the resin frame equipped membrane electrode assembly and a joint separator as the separator member.

FIG. 5 shows a positioning device 120 which is a part of the manufacturing apparatus according to the present embodiment. The positioning device 120 is a device for positioning and fixing the fuel cell member 10 and the joint separator 38.

The positioning device 120 has a base 122 (a base portion) made of an iron alloy. A first round pin 124 (positioning pin), a first polygon-shaped pin 126 (another positioning pin), a second round pin 128, and a second polygon-shaped pin 130 protrude from the upper surface 122a of the base 122.

The first round pin 124 is engaged with the first drain hole 76c. The first polygon-shaped pin 126 is engaged with the air vent hole 80c. The second round pin 128 is engaged with the first through hole 106a of the first tab 94a. The second polygon-shaped pin 130 is engaged with the second through hole 106b of the second tab 94b. Thus, the first drain hole 76c, the air vent hole 80c, the first through hole 106a, and the second through hole 106b serve as positioning holes.

Figure 6:
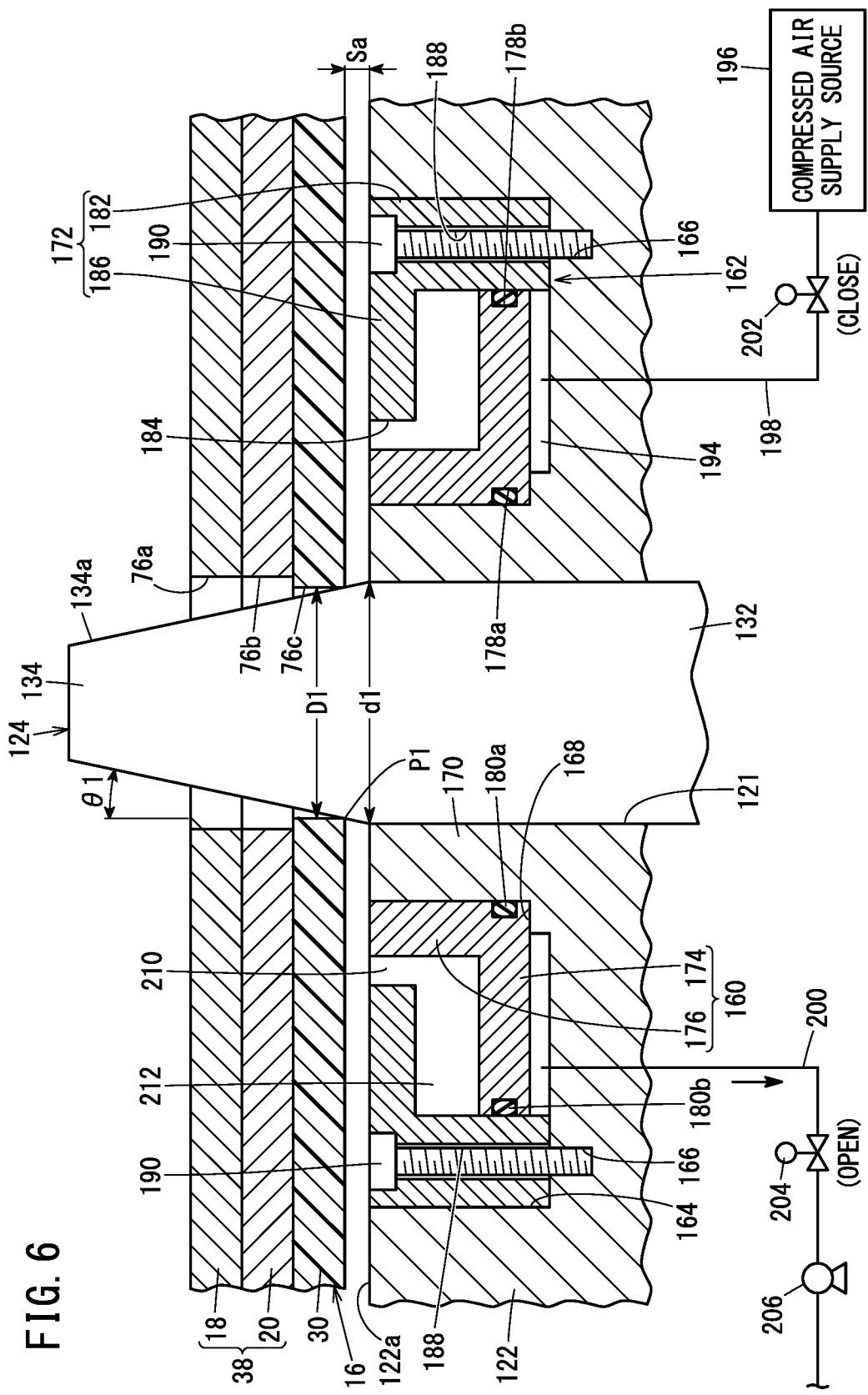
FIG. 6 is a schematic vertical sectional view of the vicinity of a first round pin of a base constituting the positioning device.

The base 122 is formed of a rectangular flat plate member. The base 122 includes four fitting holes 121 formed therein. The first round pin 124 is positioned and fixed in the fitting hole 121. The first round pin 124 has a tip having a tapered shape, which protrudes from the upper surface 122a of the base 122. More specifically, as shown in FIG. 6, the first round pin 124 has a first constant-diameter portion 132 and a first tapered portion 134. The first constant-diameter portion 132 is fitted into the fitting hole 121 formed in a cylindrical columnar portion 170 described later. The first tapered portion 134 is exposed from the fitting hole 121 and engaged with the first drain hole 76c.

The first tapered portion 134 has a circular cross-section. The first tapered portion 134 is reduced in diameter in a tapered shape toward the protruding end (i.e., toward the tip). That is, the first round pin 124 is a tapered pin. A first taper angle θ1 of the first tapered portion 134 (an intersection angle between the axis of the first round pin 124 and the first tapered portion 134) is preferably 2.0° or more and 5.0° or less, and more preferably 3.0° or more and 4.0° or less. The maximum diameter d1 of the first tapered portion 134 (i.e., the diameter of the proximal end of the first tapered portion 134) is the same as the first diameter D1 or larger than the first diameter D1. Further, the minimum diameter of the first tapered portion 134 (i.e., the diameter of the tip of the first tapered portion 134) is smaller than the first diameter D1.

A first lifting member 160 and a lifting mechanism 162 are provided around the first round pin 124. These will be described in detail later.

Similarly to the first round pin 124, the first polygon-shaped pin 126 (see FIG. 5) has a cylindrical third constant-diameter portion 138 which is fitted into the fitting hole 121. A first polygonal portion 140 engaged with the air vent hole 80c protrudes from the fitting hole 121.

The first polygonal portion 140 has a hexagonal shape having two long sides in plan view. That is, the first polygon-shaped pin 126 is a so-called diamond-shaped locator pin. The horizontal cross-section of the first polygonal portion 140 is congruent at any height. Similar to the first round pin 124, a second lifting member 220 and a lifting mechanism 162 are provided around the first polygon-shaped pin 126.

Figure 7:
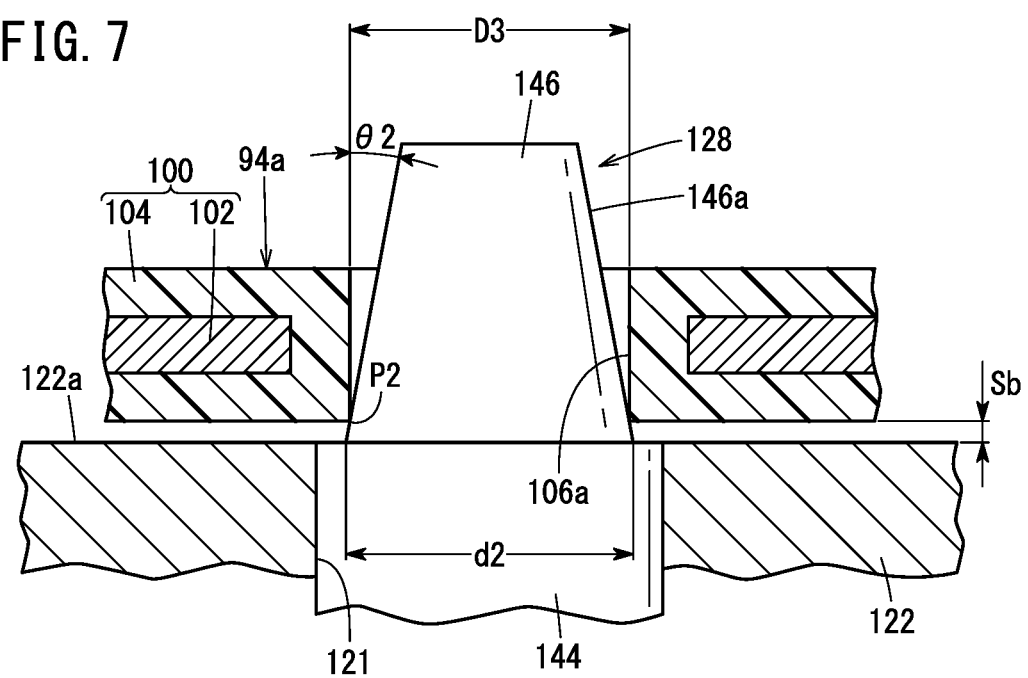
FIG. 7 is a schematic vertical sectional view of the vicinity of a second round pin of the base constituting the positioning device.

As shown in FIGS. 5 and 7, the second round pin 128 adjacent to the first round pin 124 has a second constant-diameter portion 144 and a second tapered portion 146. That is, the second round pin 128 is also a tapered pin. The second constant-diameter portion 144 is fitted into the fitting hole 121 formed in the base 122. On the other hand, the second tapered portion 146 protrudes so as to be exposed from the fitting hole 121 and is inserted into the first through hole 106a.

The second tapered portion 146 has a circular cross-section. The second tapered portion 146 is reduced in diameter in a tapered shape toward the protruding end (i.e., toward the distal end). A second taper angle θ2 of the second tapered portion 146 (an intersection angle between the axis of the second round pin 128 and the second tapered portion 146) is preferably 2.0° or more and 5.0° or less, and more preferably 3.0° or more and 4.0° or less. The maximum diameter d2 of the second tapered portion 146 (i.e., the diameter of the proximal end of the second tapered portion 146) is equal to the third diameter D3 or larger than the third diameter D3. The maximum diameter d2 of the second tapered portion 146 is larger than the maximum diameter d1 of the first tapered portion 134. The minimum diameter of the second tapered portion 146 (the diameter of the tip of the second tapered portion 146) is smaller than the third diameter D3 and larger than the minimum diameter of the first tapered portion 134.

Similarly to the first round pin 124, the first polygon-shaped pin 126, and the second round pin 128, the second polygon-shaped pin 130 disposed in the vicinity of the first polygon-shaped pin 126 has a cylindrical constant-diameter portion 150. The constant-diameter portion 150 is fitted into the fitting hole 121. A second polygonal portion 152 engaged with the second through hole 106b protrudes from the fitting hole 121.

Like the first polygonal portion 140, the second polygonal portion 152 is formed of a diamond-shaped locator pin having a hexagonal shape with two long sides in plan view. The horizontal cross-section of the second polygonal portion 152 is congruent at any height.

Next, the first lifting member 160 and the lifting mechanism 162 provided around the first round pin 124 will be described.

As shown in FIG. 6, in the base 122, an annular recess 164 is formed around the first round pin 124. The annular recess 164 and the fitting hole 121 do not communicate with each other. A plurality of (for example, four) screw holes 166 are formed in the bottom wall of the annular recess 164. The inner diameter of the lower portion of the annular recess 164 is larger than the inner diameter of the upper portion of the annular recess 164. Thus, the annular recess 164 is provided with an annular stepped portion 168 based on the difference in inner diameter between the lower portion and the upper portion. The annular stepped portion 168 serves as a lower stopper portion that supports the first lifting member 160 at a lowered position. Hereinafter, a portion above the lower stopper portion is referred to as a "cylindrical columnar portion", and its reference numeral is 170.

The first lifting member 160 and the first stopper member 172 are accommodated in the annular recess 164. The first lifting member 160 and the first stopper member 172 are arranged in this order from the inner periphery toward the outer periphery.

The first lifting member 160 includes a pressure receiving portion 174 having a circular annular shape with a large outer diameter and a pressing portion 176 having a circular annular shape with a small outer diameter. The inner diameter of the pressure receiving portion 174 is substantially equal to the inner diameter of the pressing portion 176. Annular grooves 178a and 178b are formed in the inner peripheral wall and the outer peripheral wall of the pressure receiving portion 174, respectively. O-rings 180a and 180b are mounted in the annular grooves 178a and 178b, respectively. The O-ring 180a on the inner periphery is in sliding contact with the cylindrical columnar portion 170.

The first stopper member 172 includes a hollow tube portion 182 having a large inner diameter and a ceiling wall portion 186 having a small inner diameter and formed with a through hole 184. The first stopper member 172 includes, formed therein, an insertion hole 188 extending therethrough from the ceiling wall portion 186 to the tube portion 182. The connecting bolt 190 passed through the insertion hole 188 is screw-engaged into the screw hole 166. Thus, the first stopper member 172 is positioned and fixed in the annular recess 164. The inner diameter of the annular recess 164 is substantially equal to the outer diameter of the first stopper member 172.

The O-ring 180b mounted on the outer peripheral wall of the pressure receiving portion 174 is in sliding contact with the inner peripheral wall of the tube portion 182. On the other hand, the inner diameter of the ceiling wall portion 186 (the diameter of the through hole 184) is slightly larger than the outer diameter of the pressing portion 176 and smaller than the outer diameter of the pressure receiving portion 174. Therefore, when the pressure receiving portion 174 rises, the pressure receiving portion 174 is blocked by the ceiling wall portion 186. Thus, the ceiling wall portion 186 serves as an upper stopper portion that stops the first lifting member 160 at a raised position.

The annular stepped portion 168 is in contact with the lower surface of the pressure receiving portion 174. Therefore, the first lifting member 160 is prevented from being displaced below the annular stepped portion 168. Therefore, a lower inner chamber 194 (inner chamber) is defined by the bottom wall portion of the annular recess 164, the lower surface of the first lifting member 160, and the inner peripheral wall of the tube portion 182 of the first stopper member 172.

The lifting mechanism 162 is a mechanism that supplies and discharges compressed air to and from the lower inner chamber 194. When the compressed air is supplied to the lower inner chamber 194, the first lifting member 160 is lifted. Conversely, when the compressed air is discharged from the lower inner chamber 194, the first lifting member 160 is lowered.

Specifically, a supply line 198 and a discharge line 200 are connected to the lower inner chamber 194. The supply line 198 supplies compressed air (pressure fluid) from a compressed air supply source 196 to the lower inner chamber 194. The supply line 198 is provided with a first valve 202. On the other hand, the discharge line 200 discharges the compressed air from the lower inner chamber 194. The discharge line 200 is provided with a second valve 204 and an exhaust pump 206.

The exhaust pump 206 is not essential and may be omitted. Further, it is also possible to provide a return spring (not shown) elastically urging the raised first lifting member 160 toward the annular recess 164.

The pressing portion 176 of the first lifting member 160, the cylindrical columnar portion 170, and the first tapered portion 134 of the first round pin 124 are exposed from the through hole 184. Here, an annular clearance 210 is formed between the inner peripheral wall of the through hole 184 and the outer peripheral wall of the pressing portion 176 of the first lifting member 160. The annular clearance 210 serves as a breathing hole through which the atmosphere flows into and out of an upper inner chamber 212. The annular clearance 210 is formed by the upper surface of the pressure receiving portion 174, the inner peripheral wall of the tube portion 182, and the lower surface of the ceiling wall portion 186.

As in the above, an annular recess 164 is formed around the first polygon-shaped pin 126. The second lifting member 220 and a second stopper member 222 are accommodated in the annular recess 164 (see FIG. 5). The configurations of the second lifting member 220 and the second stopper member 222 are the same as the configurations of the first lifting member 160 (see FIG. 6) and the first stopper member 172, respectively. A lifting mechanism for lifting and lowering the second lifting member 220 is also configured in the same manner as the lifting mechanism 162 shown in FIG. 6. Therefore, illustration of a cross section of the base 122 in the vicinity of the first polygon-shaped pin 126 and detailed description thereof are omitted.

The manufacturing apparatus further includes an irradiation device 230 (see FIG. 8) that irradiates laser light L. As described above, the laser beam L is a heat source for joining the resin frame equipped MEA 16 and the joint separator 38 by welding. The laser beam L travels through the passage hole 234 formed in the pressing and holding member 232.

The manufacturing apparatus according to the present embodiment is basically configured as described above. Next, the action and effect of the manufacturing apparatus will be described in relation to the manufacturing method according to the present embodiment.

Figure 9:
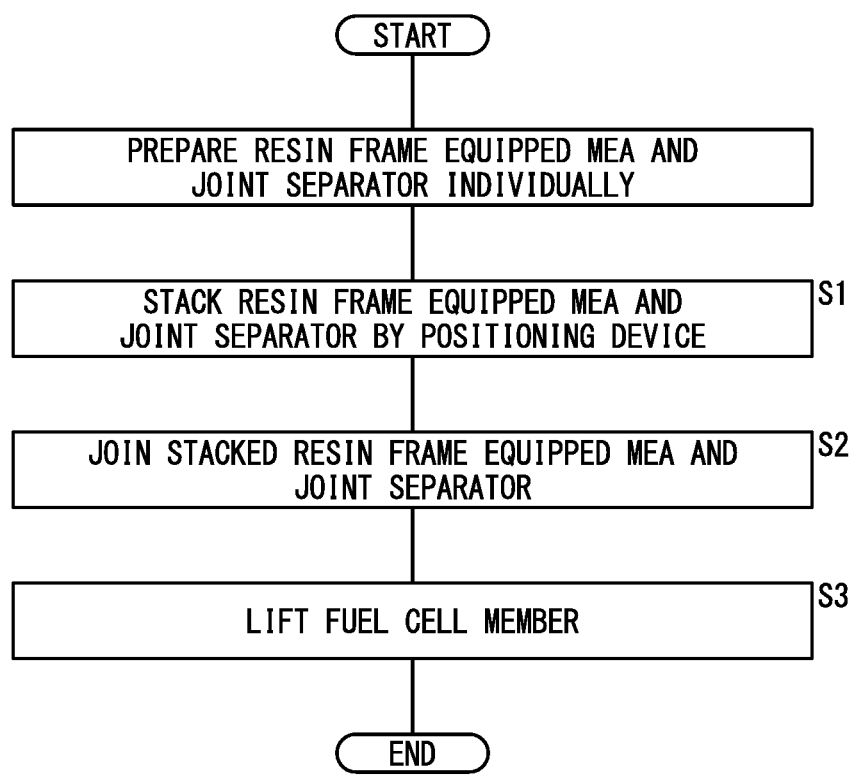
FIG. 9 is a schematic flow of the manufacturing method according to the embodiment of the present invention.

FIG. 9 is a schematic flow of the manufacturing method according to the present embodiment. The manufacturing method includes a stacking step S1, a joining step S2, and a lifting step S3. The stacking step S1 and the joining step S2 are performed under a condition in which the internal pressure of the lower inner chamber 194 and the internal pressure of the upper inner chamber 212 are the same and the first lifting member 160 and the second lifting member 220 are located at the lowermost positions. At this time, the lower surfaces of the first lifting member 160 and the second lifting member 220 come into contact with the annular stepped portion 168 (see FIG. 6).

Prior to the stacking step S1, a resin frame equipped MEA 16 for obtaining the fuel cell member 10 is prepared. Here, press forming is performed on the resin frame member 30 before the MEA 28 is incorporated. At this time, the first drain hole 76c, the second drain hole 78c, and the air vent hole 80c are formed.

On the other hand, a joint separator 38 is produced. That is, the second separator 20 is overlapped on the first separator 18 provided with the first tab 94a and the second tab 94b, and the overlapped outer peripheral edge portions are integrally joined to each other by welding, brazing, crimping, or the like. Further, press forming is performed to form the first drain holes 76a and 76b, the second drain holes 78a and 78b, and the air vent holes 80a and 80b. At the same time, the first through hole 106a is formed in the first tab 94a, and the second through hole 106b is formed in the second tab 94b. Thus, the joint separator 38, which is a separator member, is obtained.

The first separator 18 and the second separator 20 may be separately subjected to press forming. In this case, the first separator 18 is obtained in which the first through hole 106a and the second through hole 106b are formed in the first tab 94a and the second tab 94b, respectively, and the first drain hole 76a, the second drain hole 78a, and the air vent hole 80a are formed in the main body. On the other hand, the second separator 20 in which the first drain hole 76b, the second drain hole 78b, and the air vent hole 80b are formed is obtained. Thereafter, the first separator 18 and the second separator 20 are stacked and further joined to each other.

The first diameter D1 of the first drain hole 76c is smaller than the diameter of each of the first drain holes 76a and 76b of the joint separator 38 (see FIG. 6). The second diameter D2 of the air vent hole 80c is formed smaller than the respective diameters of the air vent holes 80a and 80b of the joint separator 38. The first diameter D1 is identical to the second diameter D2. Alternatively, it is also possible for the first diameter D1 and the second diameter D2 to differ from each other.

The third diameter D3 of the first through hole 106a is formed larger than the first diameter D1. The fourth diameter D4 of the second through hole 106b is formed to be larger than the second diameter D2. The third diameter D3 is the same as the fourth diameter D4. Alternatively, it is also possible for the third diameter D3 and the fourth diameter D4 to differ from each other.

Using the resin frame equipped MEA 16 and the joint separator 38 produced as described above, a stacking step S1 is performed. To be specific, as shown in FIG. 5, the resin frame equipped MEA 16 and the joint separator 38 are stacked in a state of being positioned to each other by using a positioning device 120.

More specifically, the first round pin 124 is inserted into the first drain hole 76c, and the first polygon-shaped pin 126 is inserted into the air vent hole 80c. Thus, the resin frame equipped MEA 16 is positioned by the first round pin 124 and the first polygon-shaped pin 126.

At this time, as shown in FIG. 6, the lower corner P1 of the wall surface forming the first drain hole 76c contacts the first tapered portion 134. Therefore, it is possible to prevent a gap from occurring between the outer peripheral wall of the first tapered portion 134 and the inner peripheral wall of the first drain hole 76c. Thus, the resin frame equipped MEA 16 can be positioned with high accuracy. A minute gap Sa of about several μm to several hundred μm is formed between the lower surface of the resin frame equipped MEA 16 and the upper surfaces of the cylindrical columnar portion 170, the first lifting member 160, the first stopper member 172, the second lifting member 220, and the second stopper member 222.

Next, the second round pin 128 is inserted into the first through hole 106*a*. At the same time, the second polygon-shaped pin 130 is inserted into the second through hole 106*b*. Thus, the joint separator 38 is positioned by the second round pin 128 and the second polygon-shaped pin 130. At this time, the first round pin 124 is inserted into the first drain holes 76*a* and 76*b* of the joint separator 38 (see FIG. 6). The first polygon-shaped pin 126 is inserted into the air vent holes 80*a* and 80*b* of the joint separator 38 (see FIG. 5). Therefore, when the joint separator 38 is positioned, the first round pin 124 and the first polygon-shaped pin 126 are prevented from interfering with the joint separator 38.

The lower corner P2 of the wall surface forming the first through hole 106*a* contacts the second tapered portion 146. Therefore, generation of a gap or clearance between the outer peripheral wall of the second tapered portion 146 and the inner peripheral wall of the air vent hole 80*c* is avoided. Thus, the joint separator 38 can be accurately positioned. A minute gap Sb of about several μm to several hundred μm is formed between the upper surface 122*a* of the base 122 and each of the lower surfaces of the first tab 94*a* and the second tab 94*b*.

In the above-described stacking process, the first round pin 124 and the first polygon-shaped pin 126 do not interfere with the joint separator 38. Therefore, the first round pin 124 and the first polygon-shaped pin 126 can be set to a size and a position suitable for the resin frame equipped MEA 16. Therefore, the resin frame equipped MEA 16 can be accurately positioned by the first round pin 124 and the first polygon-shaped pin 126.

Further, the second round pin 128 and the second polygon-shaped pin 130 do not interfere with the resin frame equipped MEA 16. Therefore, the second round pin 128 and the second polygon-shaped pin 130 can be set to a size and a position suitable for positioning the joint separator 38. Therefore, the joint separator 38 can be accurately positioned by the second round pin 128 and the second polygon-shaped pin 130. For the reasons described above, it is possible to improve the positioning accuracy between the resin frame equipped MEA 16 and the joint separator 38.

Moreover, in the present embodiment, the first round pin 124 and the second round pin 128 are close to each other on the base 122. Similarly, the first polygon-shaped pin 126 and the second polygon-shaped pin 130 are adjacent to each other on the base 122. In this case, the positioning accuracy between the resin frame equipped MEA 16 and the joint separator 38 can be further improved.

Next, a joining step S2 is performed. In this joining step S2, the outer peripheral portion of the joint separator 38 and the resin frame member 30 are welded together at the positions of the respective openings 96*a* to 96*f* (see FIG. 5) of the first separator 18. Specifically as shown in FIG. 8, a cylindrical pressing and holding member 232 is inserted into the openings 96*a* to 96*f* of the first separator 18. Then, the second separator 20 is pressed against the resin frame member 30 by the pressing and holding member 232. As a result, the second separator 20 and the resin frame member 30 come into close contact with each other, without gaps, at the positions of the openings 96*a* to 96*f* of the first separator 18.

Figure 10:
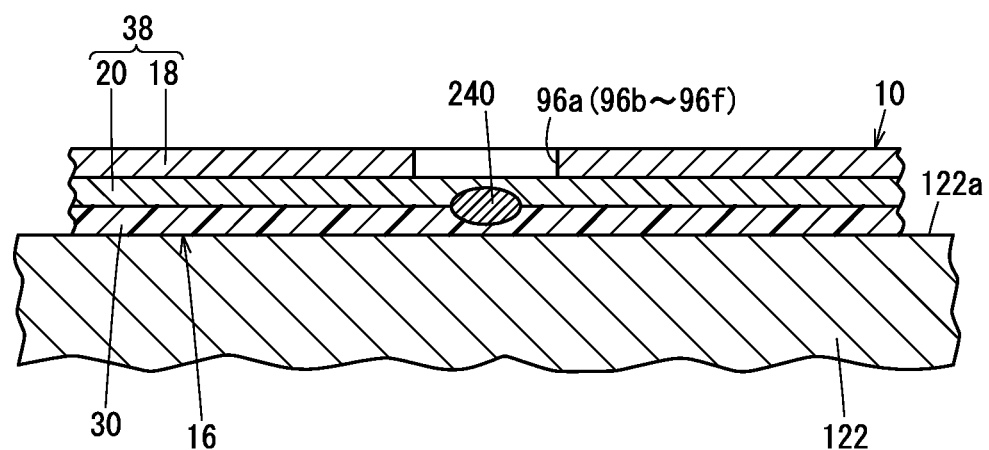
FIG. 10 is a schematic cross-sectional view of main part showing a state in which a welded portion is formed in a fuel cell member.

Subsequently, the second separator 20 is irradiated with laser light L in a spot shape through the passage hole 234 formed in the pressing and holding member 232. As a result, the heated second separator 20 and the melted resin frame member 30 are welded to each other to form a welded portion 240 shown in FIG. 10. The heat source serving as the joining means is not particularly limited to the laser light L.

As another heat source, a heated rod-shaped member is exemplified. In this case, the welded portion 240 can be formed by pressing the second separator 20 with the rod-shaped member and melting the resin frame member 30.

In this way, the resin frame equipped MEA 16 and the joining separator 38 that are in the positioned state are joined via the welded portion 240. Thus, the fuel cell member 10 can be easily obtained.

Next, a lifting step S3 is performed. For this purpose, the second valve 204 is closed and the first valve 202 is opened. Compressed air is supplied from a compressed air supply source 196. The compressed air flows through the supply line 198 and is introduced into the inner chamber. Since the second valve 204 is closed, compressed air is accumulated in the lower inner chamber 194. As a result, the pressure in the lower inner chamber 194 increases.

Figure 11:
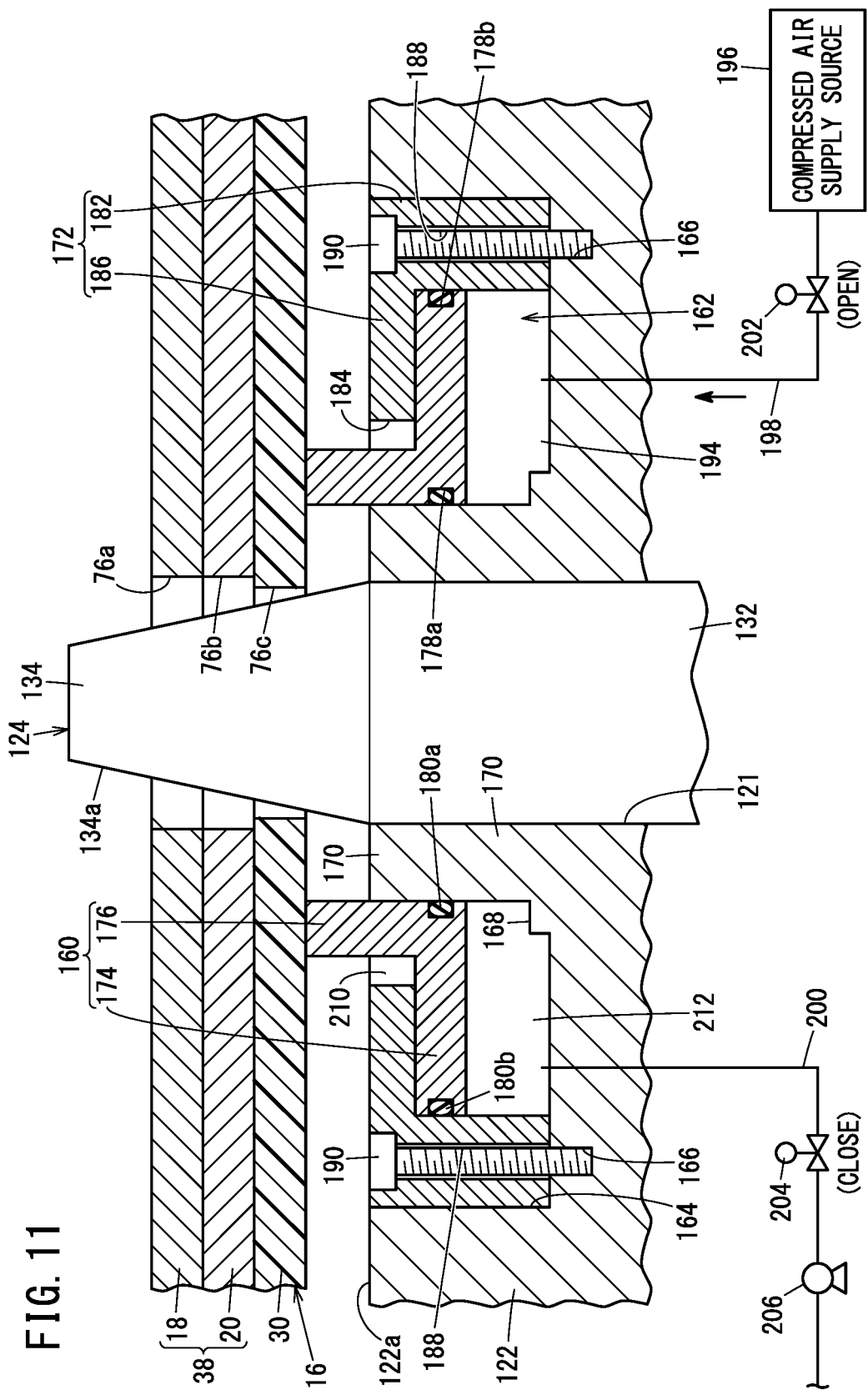
FIG. 11 is a schematic vertical sectional view of the vicinity of the first round pin showing a state in which a lifting member is lifted.

Accordingly, the pressing force of the compressed air acts on the lower surface of the pressure receiving portion 174 of the first lifting member 160. Therefore, the pressure receiving portion 174 is moved upward in the annular recess 164. At this time, the pressure receiving portion 174 is guided by the outer peripheral wall of the cylindrical columnar portion 170 of the base 122 and the inner peripheral wall of the tube portion 182 of the first stopper member 172. As a result of the upward movement of the pressure receiving portion 174, as shown in FIG. 11, the pressing portion 176 also moves upward and protrudes from the annular recess 164. At this time, the atmosphere in the upper inner chamber 212 is discharged to the outside of the annular recess 164 through the annular clearance 210.

Similarly, the second lifting member 220 is lifted in synchronization with the first lifting member 160. The raised first lifting member 160 and second lifting member 220 contact the lower surface of the resin frame member 30. The first lifting member 160 and the second lifting member 220 are further lifted to press the resin frame member 30. That is, in the present embodiment, two portions of the resin frame equipped MEA 16 are pressed by the first lifting member 160 and the second lifting member 220 respectively. As a result, the resin frame equipped MEA 16 and the joint separator 38 are lifted together with the first lifting member 160 and the second lifting member 220.

As a result, the resin frame equipped MEA 16 and the joint separator 38 are integrally displaced as the fuel cell member 10 in a direction away from the base 122. As shown in FIG. 11, the first lifting member 160 stops when the upper surface of the pressure receiving portion 174 comes into contact with the lower surface of the ceiling wall portion 186 of the first stopper member 172. The same applies to the second lifting member 220.

The diameter of the upper portion of the first tapered portion 134 is smaller than the diameters of the first drain holes 76*a* to 76*c*. The diameter of the upper portion of the second tapered portion 146 is smaller than the diameters of the air vent holes 80*a* to 80*c*. Therefore, the operator or the gripping robot can easily detach the fuel cell member 10 from the first round pin 124, the first polygon-shaped pin 126, the second round pin 128, and the second polygon-shaped pin 130. Therefore, the fuel cell member 10 can be easily removed from the positioning device 120.

As described above, according to the present embodiment, the state in which the first round pin 124 is engaged with the first drain hole 76*a* and the first polygon-shaped pin 126 is engaged with the air vent hole 80*a* is not continued. Therefore, the resin frame member 30 on the resin frame equipped MEA 16 is prevented from separating from the joint separator 38. That is, separation of the fuel cell member 10 into the resin frame equipped MEA 16 and the joint separator 38 is effectively prevented.

After the fuel cell member 10 is removed from the positioning device 120, the first lifting member 160 and the second lifting member 220 are lowered. That is, the first valve 202 is switched to the closed state, and the second valve 204 is switched to the open state. Further, the exhaust pump 206 is activated. Accordingly, the supply of the compressed air from the compressed air supply source 196 is stopped, and the compressed air in the lower inner chamber 194 is discharged through the discharge line 200 by the exhaust pump 206. As a result, the pressure in the lower inner chamber 194 decreases and balances the pressure in the upper inner chamber 212.

Therefore, the pressure receiving portion 174 is pressed by the atmosphere flowing into the upper inner chamber 212 through the annular clearance 210. As a result, the pressure receiving portion 174 and the pressing portion 176 integrally descend. That is, the first lifting member 160 and the second lifting member 220 are accommodated in the annular recess 164. The first lifting member 160 and the second lifting member 220 are blocked by the lower surface of the pressure receiving portion 174 coming into contact with the annular stepped portion 168. That is, the first lifting member 160 and the second lifting member 220 stop.

The fuel cell stack 12 is formed by sequentially stacking the fuel cell members 10 manufactured as described above. The fuel cell stack 12 does not contain therein a holding pin, a retaining ring (snap ring), and the like described in JP 2000-012067 A. Therefore, the weight of the fuel cell stack 12 can be reduced.

It should be noted that the present invention is not limited to the above-described can be adopted without departing from the gist of the present invention.

Figure 12:
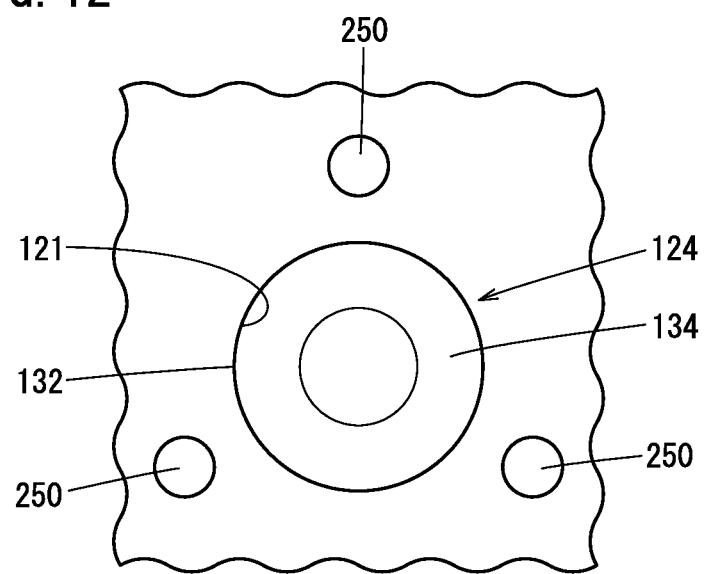
FIG. 12 is a schematic plan view of main part showing a lifting member according to another embodiment.

For example, in this embodiment, the pressing portions 176 of the first lifting member 160 and the second lifting member 220 have a circular annular shape, but as shown in FIG. 12, a plurality of columnar bodies 250 may be used as the pressing portions. In this case, similarly to FIG. 6, it is preferable to provide a circular annular pressure receiving portion 174 integrally connected to the lower ends of the plurality of columnar bodies 250. Alternatively, it is also possible to provide a plurality of actuators such as air cylinders as the lifting mechanism and use all the piston rods as the columnar bodies 250 (pressing portions).

The first lifting member 160 and the second lifting member 220 may be provided around the second round pin 128 and the second polygon-shaped pin 130. Further, it is also possible to provide a lifting member and a lifting mechanism 162 around the first round pin 124, the first polygon-shaped pin 126, the second round pin 128, and the second polygon-shaped pin 130.

It is also possible to first position and fix the joint separator 38 to the positioning device 120 and then position and fix the resin frame equipped MEA 16 to the positioning device 120.

In order to form the lower inner chamber 194, instead of providing the annular stepped portion 168, a convex portion protruding from the lower surface of the pressure receiving portion 174 toward the annular recess 164 may be provided. In this case, a clearance is formed between the bottom surface of the annular recess 164 and the pressure receiving portion 174 by the convex portion coming into contact with the bottom surface of the annular recess 164.

The position of the positioning pin is not limited to the above-described embodiment. The positioning pin may be engaged with a drain hole (first drain hole 76c) or a hole different from the air vent hole 80c. For example, a positioning hole for engaging a positioning pin may be formed.

What is claimed is:

1. A manufacturing method for a fuel cell member, for obtaining a fuel cell member by joining a separator member to a resin frame equipped membrane electrode assembly, the resin frame equipped membrane electrode assembly including a membrane electrode assembly and a frame-shaped resin frame member disposed on an outer peripheral portion of the membrane electrode assembly; the method comprising:

positioning the resin frame equipped membrane electrode assembly and the separator member by inserting a positioning pin provided in a base of a positioning device into positioning holes formed in the resin frame equipped membrane electrode assembly and the separator member, and stacking the resin frame equipped membrane electrode assembly and the separator member above a lifting member provided in the base, the lifting member being provided around the positioning pin;

welding and joining the resin frame equipped membrane electrode assembly and the separator member to thereby obtain the fuel cell member; and lifting the fuel cell member in a direction away from the positioning pin by lifting the lifting member.

2. The manufacturing method for the fuel cell member according to claim 1, wherein the lifting member of the positioning device comprises two or more lifting members, and in the lifting of the fuel cell member, two or more points of the fuel cell member are pressed by the two or more lifting members.

3. The manufacturing method for the fuel cell member according to claim 1, wherein the positioning hole of the resin frame equipped membrane electrode assembly is formed in the resin frame member.

4. A manufacturing apparatus for a fuel cell member, for obtaining a fuel cell member by joining a separator member to a resin frame equipped membrane electrode assembly, the resin frame equipped membrane electrode assembly including a membrane electrode assembly and a frame-shaped resin frame member disposed on an outer peripheral portion of the membrane electrode assembly; the apparatus comprising:

a positioning device configured to position the resin frame equipped membrane electrode assembly and the separator member, wherein the positioning device includes:

a base;

a positioning pin provided in the base and configured to be inserted into positioning holes formed in the resin frame equipped membrane electrode assembly and the separator member; and a lifting member provided in the base, the lifting member being provided around the positioning pin; and a lifting mechanism configured to lift and lower the lifting member.

5. The manufacturing apparatus for the fuel cell member according to claim 4, wherein the lifting mechanism includes an inner chamber which is formed in the base, and a pressure fluid for lifting and lowering the lifting member relative to the base is supplied or discharged to and from the inner chamber.

6. The manufacturing apparatus for the fuel cell member according to claim 4, wherein the lifting member includes a pressing portion configured to press the fuel cell member, and the pressing portion has a circular annular shape.

7. The manufacturing apparatus for the fuel cell member according to claim 4, wherein the lifting member comprises a pressing portion configured to press the fuel cell member, and the pressing portion comprises a plurality of columnar bodies.

8. The manufacturing apparatus for the fuel cell member according to claim 4, wherein the positioning pin is a tapered pin whose diameter decreases in a tapered manner in a direction away from the base.

9. The manufacturing apparatus for the fuel cell member according to claim 8, wherein the base is provided with another positioning pin formed of a diamond-shaped locator pin.

* * * * *